United States Patent [19]

Schneider et al.

[11] 3,824,966

[45] July 23, 1974

[54] AIR-FUEL SUPPLY MIXTURE CONTROL SYSTEM FOR INTERNAL COMBUSTION ENGINES

[75] Inventors: Rolf Schneider, Winnenden; Hans-Martin Müller, Asperg, both of Germany

[73] Assignee: Robert Bosch GmbH, Stuttgart, Germany

[22] Filed: Oct. 11, 1972

[21] Appl. No.: 296,601

[30] Foreign Application Priority Data
Oct. 18, 1971 Germany............................ 2151774

[52] U.S. Cl. ......................... 123/32 AE, 123/32 AE
[51] Int. Cl. ............................................. F02b 3/00
[58] Field of Search ........ 123/32 AE, 32 EA, 139 E

[56] References Cited
UNITED STATES PATENTS
2,941,524  6/1960  Aldinger......................... 123/32 EA
2,943,614  8/1960  Bosch .................................. 123/139
3,500,799  3/1970  Benson ................................. 123/32
3,643,635  2/1972  Milam................................... 123/32

FOREIGN PATENTS OR APPLICATIONS
936,945  12/1946  France............................ 123/32 EA Primary Examiner—Laurence M. Goodridge
Assistant Examiner—Ronald B. Cox
Attorney, Agent, or Firm—Flynn & Frishauf

[57] ABSTRACT

To provide an accurate determination of air flow in the inlet manifold of an internal combustion engine and, more particularly, for a fuel injection system, a guide ring is located in the intake air duct to the engine, spaced from the walls of the engine, and within the guide ring, a temperature sensitive resistor is arranged in the form of a loop, the resistor being heated, the heating current to maintain the temperature sensitive resistor at a predetermined temperature being a measure of air flow independently of turbulence occurring within the inlet tube.

10 Claims, 3 Drawing Figures

AIR-FUEL SUPPLY MIXTURE CONTROL SYSTEM FOR INTERNAL COMBUSTION ENGINES

Cross reference to related U.S. Pat. No. 3,483,851.

The present invention relates to a control system to accurately determine the amount of air which is to be mixed with fuel and, thus, to determine accurately the fuel-air mixture being applied to internal combustion engines and, more particularly, to a system to measure air flow when the fuel is injected by an electronic fuel injection system, so that the fuel to be injected can be accurately matched to the amount of air passing to the engine.

It has previously been proposed to measure the amount of air being introduced to an internal combustion engine by using a temperature sensitive resistor (see U.S. Pat. No. 2,943,614). The resistor is heated by an electrical current. It is located in the inlet system of the internal combustion engine. Changes in resistance due to different cooling by the airstream provide a measuring parameter for the air flow and, thus, the quantity of air supplied to the engine.

It has been found that the inlet system of an internal combustion engine is subject to spurious and uncontrolled backups and oscillations within the air flow, so that the measuring system does not provide an accurate representation of air flow.

It is an object of the present invention to provide a measuring system for inlet air flow, particularly adapted to be combined with an electronic fuel injection system in which the measured value of inlet air flow is an accurate representation of actual air flow.

SUBJECT MATTER OF THE PRESENT INVENTION

Briefly, the heated temperature sensitive resistor is located in the form of a loop within a ring which is placed in the inlet air tube or pipe of the internal combustion engine, and spaced from the walls of the inlet air pipe.

DRAWINGS

In order that the invention may be more clearly understood, reference will now be made to the accompanying drawings in which FIG. 1 is a highly schematic representation of a fuel injection system;

Figure 1:
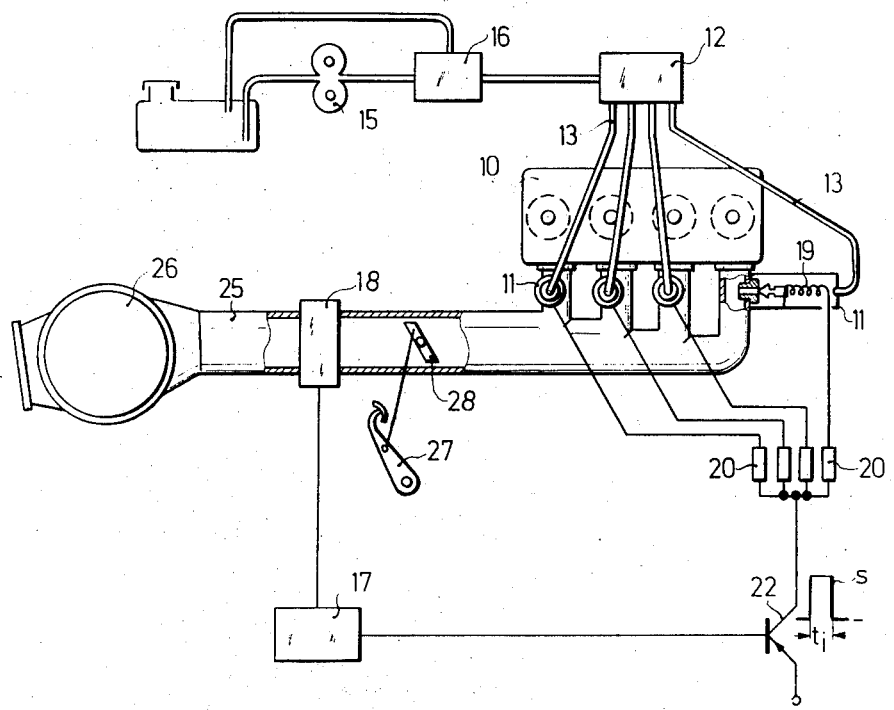

A complete electronic fuel injection system as shown and disclosed in U.S. Pat. No. 3,483,851, assigned to the assignee of the present invention; FIG. 1 only illustrates so much of such a system as is necessary for an understanding of the present invention. Similar parts have been given the same reference numerals throughout the drawings.

The control system is illustrated in connection with a fuel injection system as shown in FIG. 1, applied to a four-cylinder internal combustion engine 10. Other numbers of cylinders can be used, and other fuel supply systems may likewise be used. The fuel injection system, as shown in FIG. 1, uses four electro-magnetically operated injection valves 11 which have gasoline applied thereto over inlet line 13 from a fuel distributor 12. Fuel is applied to distributor 12 by a pump 15 from a tank, then conducted over a pressure regulator 16, which controls the fuel pressure to a fixed, predetermined value. An electronic injection control system is illustrated schematically at 17, and reference may be had to the aforementioned patent for a fuller disclosure of a system to accurately control the amount of fuel to be applied to the various cylinders of an internal combustion engine. The time $t_i$ of an opening pulse S determines the time period or duration during which the injection valves 11 are open, and, therefore, the amount of fuel which can be injected. Since the fuel pressure is practically constant, at the value of about 2 at-gauge, the fuel quantity is practically proportional to the time that the valve 11 is open. The solenoid winding 19 of the valve 11 is connected, each over a coupling resistor 20, to the emitter-collector path of a power transistor 22, schematically illustrating an amplifier and power stage of the fuel injection system, the conduction time of the transistor 22 determining $t_i$.

Internal combustion engines utilizing separate ignition, and in which the air-fuel mixture is compressed during the compression stroke require accurately predetermined portions of air and fuel so that the fuel can be completely burned during the subsequent power stroke. Thus, the amount of air being applied to any one cylinder must be matched accurately to the amount of fuel being injected. Efficient utilization of fuel, and thus efficient operation of the internal combustion engine requires complete combustion, with essentially no excess air being present in the cylinder after the combustion stroke. In order to accurately maintain the desired stoichiometric relationship between supplied air and fuel, a sensing element 18 is located in the inlet tube 25 of the internal combustion engine, ahead of throttle 28, operable by an accelerator pedal 27, and behind air filter 26.

Figure 2:
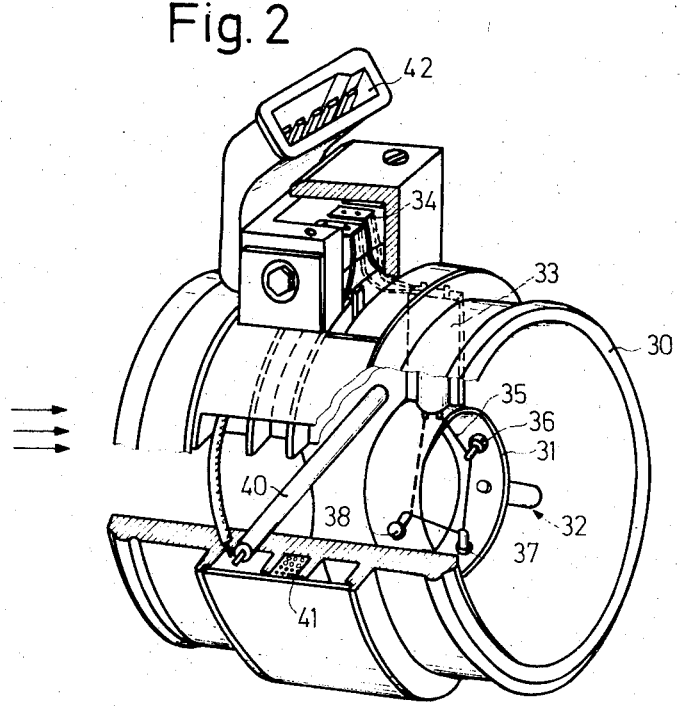
FIG. 2 is a schematic view of an air sensing system.

The sensing element 18 is seen in greater detail in FIG. 2, where the inlet pipe 25 (FIG. 1) is shown as a circular tube 30. The air flow of inlet air is indicated by the arrows. A concentric ring 31, in the form of a tube portion, is maintained spaced from the walls of inlet tube 30 by a pair of radial bolts 32, only one of which is seen in FIG. 2. Ring 31 is further secured by a third attachment element formed by an insulating bushing 33, through which connection wires are taken which connect a temperature sensitive, heated resistor 35 with a distributor head 34. Resistor 35 is a platinum wire held within ring 31 by spacers 36, 37, 38, in the form of a loop. The spacers stretch the wire 35, and are of a material which is heat insulating so that little or no heat is transferred from wire 35 to the ring 31, while simultaneously serving as electrical insulation.

Platinum wire 35 is connected to a source of electrical current; as current flows, the wire 35 will heat. The heating of the wire will depend on the speed of gases passing past wire 35; thus, the heat which has to be supplied to the wire, that is, its current, to keep it at a predetermined resistance value is a measure for the amount of air being introduced to the internal combustion engine. If a control circuit is used to maintain the temperature of the platinum wire at a constant value, a fixed relationship between current through the platinum wire and introduced air will be established. The heating of the platinum wire 35 depends not only on the flow, that is, on the stream of air past the wire, but also on the ambient temperature of the air itself. To compensate for changes in ambient temperature, a further temperature dependent resistor 40 is provided which is placed upstream (with respect to air flow) of the platinum wire 35. Current through the resistor 40 is selected to be so small that heating due to this current will be negligible with respect to the temperature of the air being sucked past the platinum wire 35.

Resistor 40 is provided only to measure relatively slowly changing temperatures, and thus may have a substantial heat capacity, which permits sturdy construction of such a resistor. The heat dissipation of resistor 35, however, should be substantially without inertia. Thus, this resistor consists only of a thin wire with as little thermal contact with any other structural part, as possible.

Oscillations and spurious changes in flow, arising in the inlet tubes of internal combustion engines interfere with the operation of flow measuring devices. These variations in air flow arise primarily along the walls of the inlet pipes. By placing rings 31 around the wire 35, the air flow past the wire 35 is essentially independent of such variations.

As explained in detail in connection with the circuit diagram of FIG. 3, the temperature dependent resistors 35 and 40 are complemented by two further resistors to form a bridge circuit. This entire bridge circuit is preferably included in one structural unit. The further resistors, preferably, are several windings of a suitable material, for example, they are manganin wire resistors located, as seen at 41, on the tubular body 30. The entire assembly of the insert tube 30, resistors 35 and 40, and the manganin wire resistors are one complete structural and electrical unit, including the electrical bridge circuit components, and are adapted to be electrically connected by a multiple connector 42. A trimmer resistor 45, the function of which will be explained below, may likewise be located on the structural unit, for adjustment, for example, by means of a screwdriver slot.

Figure 3:
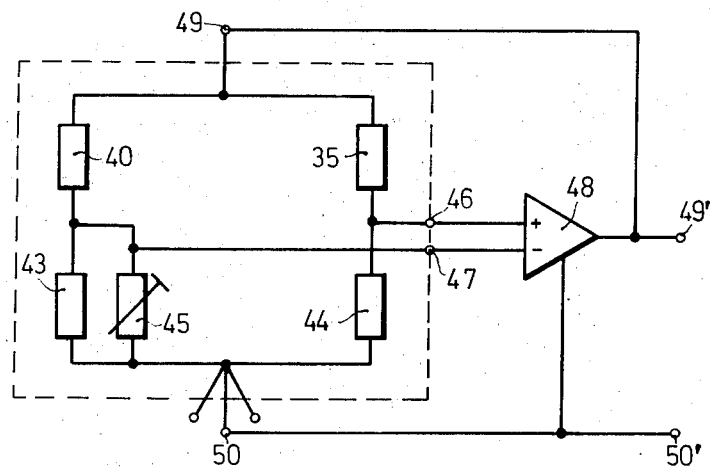
FIG. 3 is a schematic circuit diagram of the sensing system of FIG. 2, in an electrical circuit, illustrating how an electrical signal as a representation of air flow can be obtained.

The electrical circuit is illustrated in FIG. 3; the portion within the dashed lines includes those circuit elements which are on the tube part 30 and form the assembly of FIG. 2. They include temperature sensitive resistors 35 and 40, resistors 43 and 44, and trimmer resistor 45. The right branch of the bridge can be substantially less resistive than the left branch. Resistor 35, thus, transduces a greater portion of electrical energy into heat than resistor 40. Connection points 46, 47, that is, one of the diagonal of the bridge, are connected to a differential amplifier 48; the output voltage of the differential amplifier 48 is applied to the other bridge circuit diagonals over connections 49, 50.

Operation: As the air speed of air passing wire 35 increases, wire 35 is cooled more strongly. Due to its positive temperature coefficient, the resistance of resistor 35 decreases, which shifts the voltage of the terminal 46 in the direction of the voltage of terminal 49. This increases the output voltage of differential amplifier 48, and increases the supply voltage to the bridge circuit, which causes higher current to flow through platinum wire 35, thus heating the wire to a greater extent, until a balance is established. The changes in output voltage of differential amplifier 48 can be taken off terminals 49', 50' as a measure of the amount of air introduced through tube 30, that is, through the inlet tube to the engine. The output voltage across terminals 49', 50' then can be used as a control parameter to control the injection duration $t_i$ (FIG. 1) in order to match the amount of fuel injected into the cylinders exactly to the amount of air actually passing through the inlet manifold to the cylinders of the engine.

Various changes and modifications may be made within the inventive concept.

We claim:

1. In an air-fuel measuring supply control system for an internal combustion engine having means for measuring the amount of air being introduced to the engine, said means having an air inlet tube (30) through which air is guided to the engine;

a temperature responsive resistor (35) located in the air stream passing through said tube (30);

means (49, 50) supplying electrical heating current to said resistor (35);

and means (46, 47) deriving an electrical signal representative of change of current flowing through the resistor as a function of change of air flow in the inlet tube to the engine;

the improvement comprising a tubular air guide and support ring (31) located in the interior of, and spaced from the walls of the air inlet tube (30) to the engine, the temperature responsive resistor (35) being a resistance wire arranged in the form of a loop and located within the guide ring (31).

2. A system according to claim 1 in combination with a fuel injection system having a control unit (17) controlling the amount of fuel being injected to the engine, wherein the electrical signal is applied to said control unit to provide a control parameter to regulate the amount of fuel being injected and to provide a stoichiometric air-fuel mixture to the engine.

3. A system according to claim 1 wherein a plurality of spacer attachments (36, 37, 38) are provided circumferentially securing the wire within the ring (31), the wire (35) being stretched between the spacers.

4. A system according to claim 1 wherein the guide ring forms part of the inlet tube to the engine.

5. A system according to claim 1 further comprising a temperature sensing means (40) located in the stream of inlet air and sensing the temperature of air passing through said ring.

6. A system according to claim 5 wherein said air temperature sensing means comprises a temperature sensitive resistor (40) located in the stream of air upstream of the loop temperature responsive resistor (35).

7. A system according to claim 5 wherein the temperature sensing means (40) comprises an electrical resistor means changing resistance with change in air temperature, said temperature responsive resistor (35) and said resistor means being connected in a bridge circuit, said bridge circuit including further resistors which are temperature independent (43, 44, 45), said bridge circuit including said temperature dependent resistors (35, 40) and said temperature independent resistors (43, 44, 45), and said ring forming a unitary structural assembly located in the stream of inlet air passing to the engine.

8. A system according to claim 2 wherein a plurality of attachment means (36, 37, 38) are provided circumferentially securing the wire (35) to the ring (31) and stretching the wire in loop-arrangement within the ring.

9. A system according to claim 2 further comprising a temperature sensing means (40) located in the stream of inlet air and sensing the ambient temperature of air passing through said ring.

10. A system according to claim 9 wherein
the temperature sensing means comprises an electrical resistor (40) said electrical resistor and said temperature responsive resistor (35) forming one resistance, each, of the branches of a bridge circuit; two essentially temperature independent resistance means (43, 44, 45), one each being connected to said resistor (40) and said temperature sensitive resistor (35) and completing the arms of the bridge, one of said resistors being adjustable, said resistors of said bridge circuit, and said ring forming a single structural unit located in the inlet tube to the internal combustion engine.

* * * * *